United States Patent
Bouanaka et al.

[11] Patent Number: 6,023,502
[45] Date of Patent: Feb. 8, 2000

[54] METHOD AND APPARATUS FOR PROVIDING TELEPHONE BILLING AND AUTHENTICATION OVER A COMPUTER NETWORK

[75] Inventors: Hansali Bouanaka, Tinton Falls; Moshiur Rahman, Freehold, both of N.J.

[73] Assignee: AT&T Corp., New York, N.Y.

[21] Appl. No.: 08/960,772

[22] Filed: Oct. 30, 1997

[51] Int. Cl.[7] .................................................. H04M 15/00
[52] U.S. Cl. ......................... 379/115; 379/91.01; 705/26; 705/44
[58] Field of Search .............................. 379/51.01, 51.02, 379/112, 114, 115, 121, 127; 705/26, 39, 40, 44, 14; 235/380, 382

[56] References Cited

U.S. PATENT DOCUMENTS

| | | | |
|---|---|---|---|
| 5,336,870 | 8/1994 | Hughes et al. | 235/379 |
| 5,638,431 | 6/1997 | Everett et al. | 379/115 |
| 5,749,075 | 5/1998 | Toader et al. | 705/14 |
| 5,825,857 | 10/1998 | Reto et al. | 379/112 |
| 5,835,580 | 11/1998 | Fraser | 379/115 |
| 5,845,267 | 12/1998 | Ronen | 379/114 |
| 5,867,495 | 2/1999 | Elliot et al. | 379/114 |

*Primary Examiner*—Paul Loomis

[57] ABSTRACT

A purchase authenticating and billing method and system for automatically authenticating customer information and to place charges on customer's telephone bill. The customer authentication and billing information is requested in a computer protocol and converted to a telephone protocol, then a response is generated and the billing information is added to a telephone data base, if authentication occurred successfully.

11 Claims, 2 Drawing Sheets

METHOD AND APPARATUS FOR PROVIDING TELEPHONE BILLING AND AUTHENTICATION OVER A COMPUTER NETWORK

CROSS-REFERENCE TO RELATED APPLICATIONS

The invention disclosed herein is related to the U.S. patent applications by Bouanaka, et al., entitled "METHOD AND APPARATUS FOR PROVIDING TELEPHONE DIRECTORY ASSISTANCE OVER A COMPUTER NETWORK", Ser. No. 08/928,079 filed on September 1997, and "METHOD AND APPARATUS FOR PROVIDING TELEPHONE VALIDATION OF INTERNET-CARDS FROM A COMPUTER NETWORK", Ser. No. 08/960,762 filed on October 1997, both assigned to AT&T, and incorporated herein by reference.

FIELD OF THE INVENTION

The present invention relates generally to providing authentication of telephone numbers on demand, and more particularly, to providing authentication for purchases to be charged to a telephone number.

BACKGROUND OF THE INVENTION

Businesses often conduct business over the telephone, by mail, or over a computer network such as the Internet. Such sales are often charged to credit cards, paid cash-on-delivery ("C.O.D."), or a bill is mailed to the customer. See for example, U.S. Pat. No. 5,336,870. However, not all potential customers have credit cards or they prefer not to charge new purchases to their credit cards. Likewise, C.O.D. and mailed bills may not be a desirable option.

Some businesses offer billing directly to the customer's telephone bill. However, currently these are limited to telephone related business such as 900 telephone calls.

A recognized problem, therefore, is the inability of businesses to authentic customer telephone information and place charges directly on customer's telephone bills.

SUMMARY OF THE INVENTION

The aforementioned problems are solved by providing businesses the option of placing charges for products and services on a customer's telephone bill.

In an embodiment of the present invention, a customer places an order over the telephone, in person, or by mail. An employee of the business enters the relevant data into a computer terminal ("first computer terminal"). The relevant data may include some or all of the following information: customer information, such as name, phone number and address, and purchase information, such as product codes for items purchased, cost of each item, and delivery method. An authentication request is transmitted to the telephone company to verify the customer's telephone number from the telephone company's customer data base. Upon authentication of the information, a charge request is transmitted to the telephone data base to place the charge on the customer's telephone bill.

In an other embodiment of the present invention, the customer purchases products and services on a computer terminal ("second computer terminal") over a computer network connected to a the business computer terminal ("first computer terminal"). The authentication of customer information from the telephone company's customer data base occurs automatically. Then, the charges are placed on the customer's telephone bill.

DETAILED DESCRIPTION OF THE PREFERRED EMBODIMENT

Figure 1:
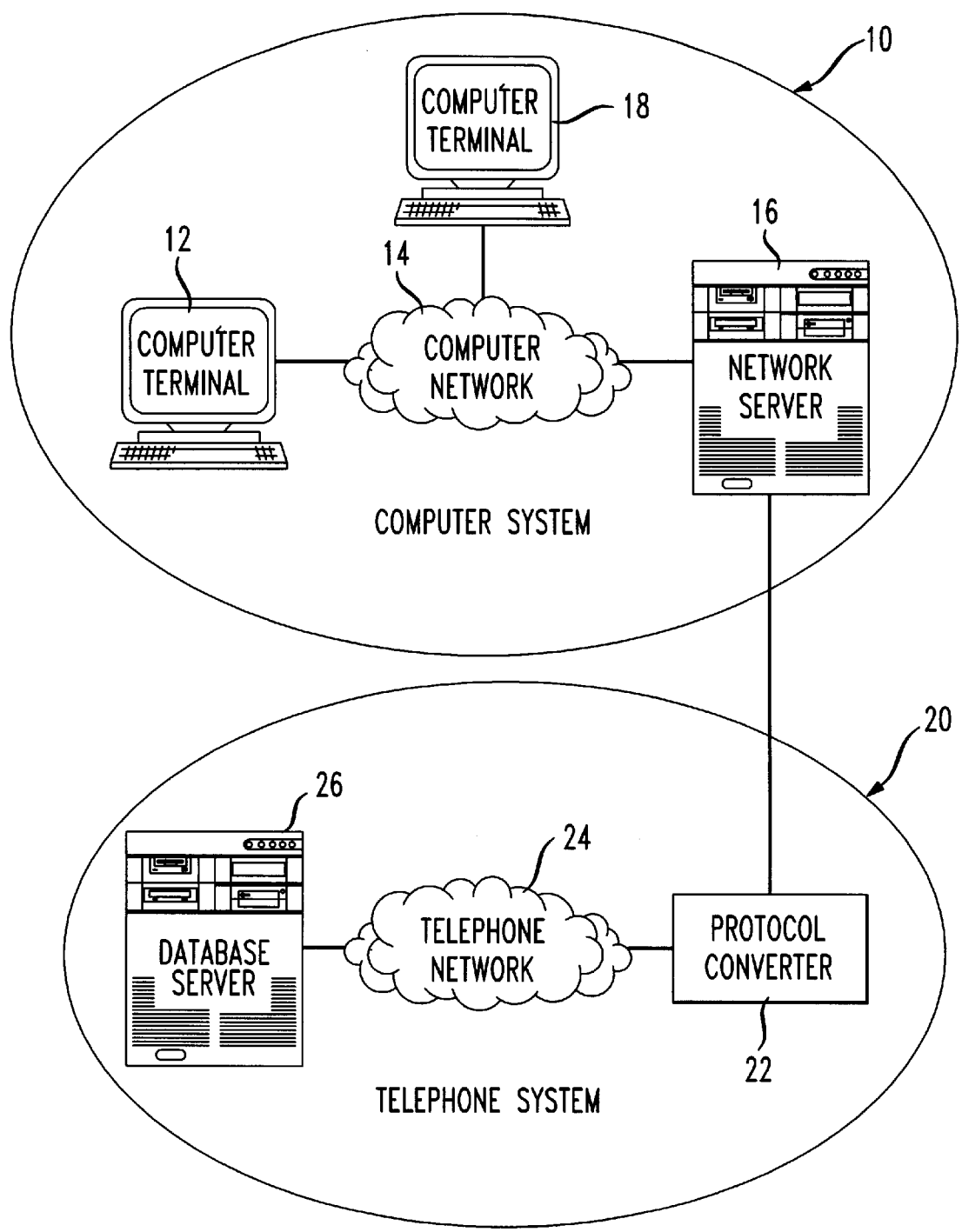
FIG. 1 is a system diagram illustrating an embodiment of a telephone authentication system.

Referring to FIG. 1, a telephone system 20 receives a request for authentication of customer information from a computer system 10. The telephone system 20 searches its data base, then transmits a response to the computer system 10. Upon authentication, the charges are placed on the customer's telephone bill.

The computer system 10 includes one or more computer terminals 18 for processing requests and receiving responses, optionally one or more computer terminals 12 used by customers, one or more computer networks 14 connected to the business's computer terminals 18 and to the customer's computer terminals 12, and optionally one or more network servers 16 connected to the computer network 14. When the Protocol converter 22 and the computer network 14 communicate using compatible protocols, no network server 16 is required and the protocol converter 22 is connected directly to the computer network 14.

As is well known in the art, the computer terminals 12 and 18 can be any computer network compatible device including a personal computer, a display terminal, a laptop computer, a palmtop computer, a workstation, a mainframe computer, or other network compatible device.

The computer network 14 transmits messages in a computer network protocol. Computer network protocols, well known in the art, include local area networks, wide area networks, and other computer networks. It is a preferred embodiment of the present invention that the computer network 14 include the Internet. In another embodiment, the network includes a network capability in the computer terminal 18 connected directly to a protocol converter 22.

A preferred embodiment of the invention includes encrypted communication between the customer's computer terminal 12 and the business' computer terminal 18 as well as between the business's computer terminal 18 and the network server 16. Additionally, the network server 16 and the protocol converter 22 can be co-located or the communication can be encrypted to protect the communication.

The computer system 10 can be a private computer system such as an intra-company or campus computer system. Also, the computer system can encompass a global computer system including the Internet or combinations of varying networks.

The network server 16 is a computer network compatible device, well known in the art, that converts network protocols to a known communication protocol. It is a preferred embodiment of the present invention that the network server converts various network protocols to a Transmission Control Protocol/Internet Protocol ("TCP/IP"). If the network protocol used by the computer network 14 is TCP/IP then the network server 16 need not perform a conversion and the network server 16 becomes optional. If no network server 16 is required, the protocol converter 22 can communicate directly with the computer network 14 or the computer terminal 18.

The telephone system 20 includes one or more protocol converters 22, one or more telephone networks 24 connected to the protocol converter 22, and one or more data base servers 26 connected to the telephone network 24. The protocol converter 22 is connected to a network server 16 in the computer system 10 or directly to the computer network 14 if no network server is required. The data base server 26 contains telephone customer information including billing information.

The protocol converter 22 converts a known communication protocol to a telephone protocol. It is a preferred embodiment of the present invention that the protocol converter 22 be a Signaling Protocol Converter ("SPC") available from American Telegraph and Telephone ("AT&T"). The SPC converts messages between TCP/IP protocol and Signaling System 7 ("SS7") protocol. Such a SS7 message includes a Transactional Capabilities Application Part ("TCAP") message.

The telephone network 24 includes well known telephone networks such as private branch exchanges ("PBX"), local exchange carrier ("LEC") networks, and long distance networks. The telephone system 20 can be a private telephone system such as is an intra-company or campus telephone system.

Data base server 26 includes data base servers currently used to provide customer billing information to telephone companies.

Figure 2:
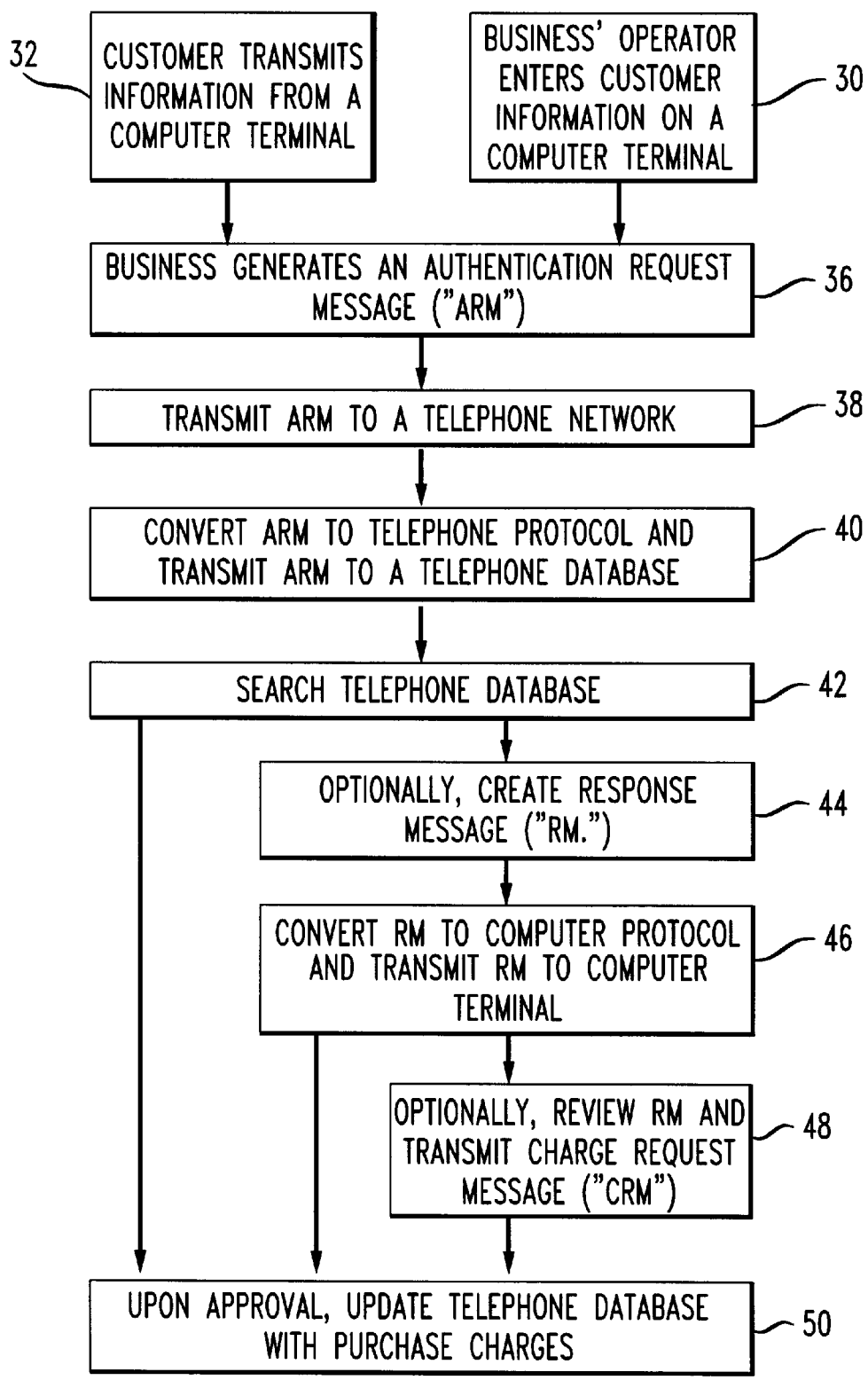
FIG. 2 is a flow diagram illustrating an embodiment of a telephone authentication transaction.

Referring to FIG. 2, customer can place a purchase order over the telephone and the customer's telephone account is immediately verified and the charge is placed on the account. For example, a customer contacts a business by telephoning an operator, 30. The operator enters the customer information into a computer terminal 18 (FIG. 1) including items desired to purchase and customer's telephone number and name. Optionally, the customers' billing telephone number can be obtained directly by caller identification device when the customer is telephoning from the billing telephone number.

Additional information such as pricing of items requested or customer's purchase history can be added automatically or manually.

Alternatively, the customer can enter their purchase request directly on their computer terminal 12 (FIG. 1) and transmit 32 it to the business.

An authentication request message ("ARM") is generated 36 at the business' computer terminal 18 (FIG. 1). The operator then transmits 38 an ARM containing the customer and related information through the computer network 14 (FIG. 1) to a network server 16 (FIG. 1) in the network protocol. The computer terminal 18 knows the network address of network server 16 or the protocol converter 22 if no network server 16 is required.

If the network protocol is not known to the protocol converter, the network server 16 converts the ARM from the network protocol to a protocol known to the protocol converter 22.

The protocol converter 22 (FIG. 1) receives the ARM, converts 40 the request message to a telephone protocol. Then, the protocol converter 22 transmits the ARM to the data base server 26 (FIG. 1) through the telephone network 24 (FIG. 1) in the telephone protocol.

The data base server 26 (FIG. 1) accesses 42 the customer information data base.

Optionally, the data base server can generate 44 a response message ("RM"). The data base server 26 transmits 46 the response message to the business computer terminal 18. The data base server 26 transmits the response message in the telephone protocol through the telephone network 24 to the protocol converter 22. The protocol converter 22 converts the response message from the telephone protocol to a computer protocol and transmits it to the computer system 10. The network server 16 in the computer system 10 receives the response message. If the network protocol is different then the computer protocol known to the protocol converter 22, the network server translates the response message to the network protocol. The network server 16 transmits the response message to the first computer terminal 18 through the computer network 14.

Optionally, the approval of the purchase can occur in the first computer terminal 48. Then a charge request message is sent to data base server 26 to place the charge on the telephone account of the customer.

The request for telephone number authentication includes a variety of search parameters and various search types. For example, the request can be a simple request for a telephone number associated with a person or business name and address. A complex request can include requests for the customer's telephone number, payment history, payment due date, current balance, social security number, and non-telephone payment option. The optional feature of a non-telephone payment option indicates whether the customer has approved non-telephone charges to be placed on their telephone bill. Additional information that identify the customer or the type of product or service desired can be included in the request message. Type of service desired includes requesting various responses such as small purchase authorization, large purchase authorization, full customer background information, and status of prior payments.

Approval of the purchase can occur in the telephone data base server 26 after a successful authentication or in the business' computer after evaluating the response message. If the business desires to evaluate the information in the response message, then a charge request message ("CRM") can be sent 48 to place the appropriate charge on the customer's bill. The CRM is sent from the business to the telephone data base server as the ARM was sent.

Upon approval, the telephone data base is updated 50 to reflect the charge on the customer's telephone account for the product or services purchased.

The response message includes the requested information or a notice. The response includes all or some of the information requested with the remainder indicated as not available. Notices include "notice of excessive response", "notice of null set", "notice of error", and "notice of insufficient data." The "notice of excessive response" indicates that the search is likely to return more than a specified number of responses. This can occur when the request contains only a common name such as "John Smith" and no additional information. In a preferred embodiment, the name and the telephone number are included in the request. The "notice of null set" indicates that no information matches the request. The "notice of error" indicates that the request can not be processed. The "notice of insufficient data" indicates that the request message failed to specify enough information to form a search.

By using the telephone authentication system described above, customers can purchase products and services and place the charges directly on their telephone bill. Thus, the need for credit cards or C.O.D. purchases is eliminated.

A preferred embodiment includes an intra-company or intra-campus computer and telephone networks. For example, an employee could order items, such a computer mouse, from the company's warehouse and the bill is charged to the employee's corporate telephone bill.

Likewise, an employee or student in a campus wide computer and telephone network could order items and the charges would appear on their telephone bill.

While preferred embodiments have been shown and described, it will be understood that they are not intended to limit the disclosure, but rather it is intended to cover all modifications and alternative methods and apparatuses falling within the spirit and scope of the invention as defined in the appended claims or their equivalents.

What is claimed is:

1. A method of billing comprising the steps of:
   (a) receiving an authentication request message in a telephone system from a computer system, the request message being in a first computer protocol and specifying customer information;
   (b) converting the request message to a telephone protocol;
   (c) transmitting the request message in the telephone protocol to a telephone data base server;
   (d) searching a telephone data base for requested information;
   (e) charging customer's telephone account based on information from the request message;
   (f) generating a response message in response to the search in the telephone protocol;
   (g) converting the response message to the first computer protocol; and
   (h) transmitting the response message to the computer system.

2. The method of billing as recited in claim 1, wherein the receiving authentication message step includes:
   (a) entering customer information at a first computer terminal;
   (b) creating an authentication request message including customer information at the first computer terminal;
   (c) transmitting the authentication request message through a computer network using a second computer protocol;
   (d) converting the request message to the first computer protocol; and
   (e) transmitting the request message in the first computer protocol to the telephone system.

3. The method of billing as recited in claim 1, wherein the receiving authentication message step includes:
   (a) entering customer information at a second computer terminal and transmitting the customer information to a first computer terminal;
   (b) creating an authentication request message including customer information at the first computer terminal;
   (c) transmitting the authentication request message through a computer network using a second computer protocol;
   (d) converting the request message to the first computer protocol; and
   (e) transmitting the request message in the first computer protocol to the telephone system.

4. The method of billing as recited in claim 3, wherein the first computer protocol is the same as the second computer protocol.

5. A method of billing comprising the steps of:
   (a) receiving an authentication request message in a telephone system from a computer system, the request message being in a first computer protocol and specifying customer information;
   (b) converting the request message to a telephone protocol;
   (c) transmitting the request message in the telephone protocol to a telephone data base server;
   (d) searching a telephone data base for a match between the purchaser's information;
   (e) generating a response message in the telephone protocol including authentication data or error message;
   (f) converting the response message to the first computer protocol;
   (g) transmitting the response message to the computer system;
   (h) evaluating the response message in the first computer terminal;
   (i) transmitting a charge request message from the first computer terminal to the telephone system
   (j) converting the charge request message to the telephone protocol; and
   (k) Charging customer's telephone account based on information in the charge request message.

6. A telephone billing system comprising:
   (a) a computer system;
   (b) a protocol converter connected to the computer system, the protocol converter converting messages between a first computer protocol and a telephone communication protocol;
   (c) a telephone communication network connected to the protocol converter; and
   (d) a data base server connected to the telephone communication network, the data base server comprising customer billing information from a telephone data base;
   (e) a network server connected to the protocol converter for converting messages between the first computer protocol and a second computer protocol;
   (f) a computer network utilizing a second computer protocol, the computer network being connected to the network server; and
   (g) a first computer terminal for entering customer information, generating request messages, and displaying response messages, the first computer terminal being connected to the computer network.

7. The telephone billing system as recited in claim 6 wherein the computer system further comprises:
   (a) a second computer terminal for entering customer information, the second computer terminal being connected to the first computer terminal through the computer network.

8. The telephone billing system as recited in claim 7 wherein the computer network includes the Internet.

9. The telephone billing system as recited in claim 8 wherein the first computer protocol being Transmission Control Protocol/Internet Protocol.

10. The telephone billing system as recited in claim 8 wherein the telephone communication protocol being a Signaling System 7 protocol.

11. The telephone billing system as recited in claim 6 wherein the computer system comprises:
    (a) a computer network utilizing the first computer protocol, the computer network being connected directly to the protocol converter; and
    (b) a first computer terminal for entering customer information, generating request messages, and displaying response messages, the first computer terminal being connected to the computer network.

* * * * *